May 1, 1934.  R. C. NEWHOUSE ET AL  1,956,584

LUBRICATING SYSTEM

Filed May 19, 1930

Inventors
R. C. Newhouse
G. D. Becker
by
Attorney

Patented May 1, 1934

1,956,584

UNITED STATES PATENT OFFICE 1,956,584

LUBRICATING SYSTEM

Ray C. Newhouse, Wauwatosa, and George D. Becker, West Allis, Wis., assignors to Allis-Chalmers Manufacturing Company, Milwaukee, Wis., a corporation of Delaware Application May 19, 1930, Serial No. 453,446

16 Claims. (Cl. 308—170)

This invention relates in general to improvements in the art of lubrication, and relates more specifically to improvements in the construction and operation of lubricating systems for machines of various types.

A general object of the invention is to provide an improved lubricating system which is simple in construction and efficient in operation.

Some of the more specific objects of the invention may be enumerated as follows:

To provide an improved gravity feed lubricating system for superimposed bearings of a machine.

To provide means for effectively lubricating the bearings of a gyratory machine such as a crusher of the vertical gyratory type.

To provide improved instrumentalities for lubricating thrust bearings associated with elements which are movable about substantially vertical axes.

To provide improved means for insuring proper lubrication of eccentrics rotatable at relatively high speed about substantially vertical axes.

To provide means for effectively lubricating material treating machines such as crushers, without permitting lubricant to enter the material being treated.

To provide an improved fluid support for a machine element, and means for utilizing lubricant from the bearing lubricating system, for the purpose of effecting adjustment of the support.

To provide improvements in mechanisms for circulating oil through a lubricating system.

To provide improved means for protecting the lubricant in a system against ingress of dust and foreign matter.

These and other objects of the invention will appear from the following detailed description.

A clear conception of embodiments of the several novel features constituting the present improvement and of the mode of operating machines built in accordance therewith, may be had by referring to the drawing accompanying and forming a part of this specification in which like reference characters designate the same or similar parts in the various views.

Figure 1:
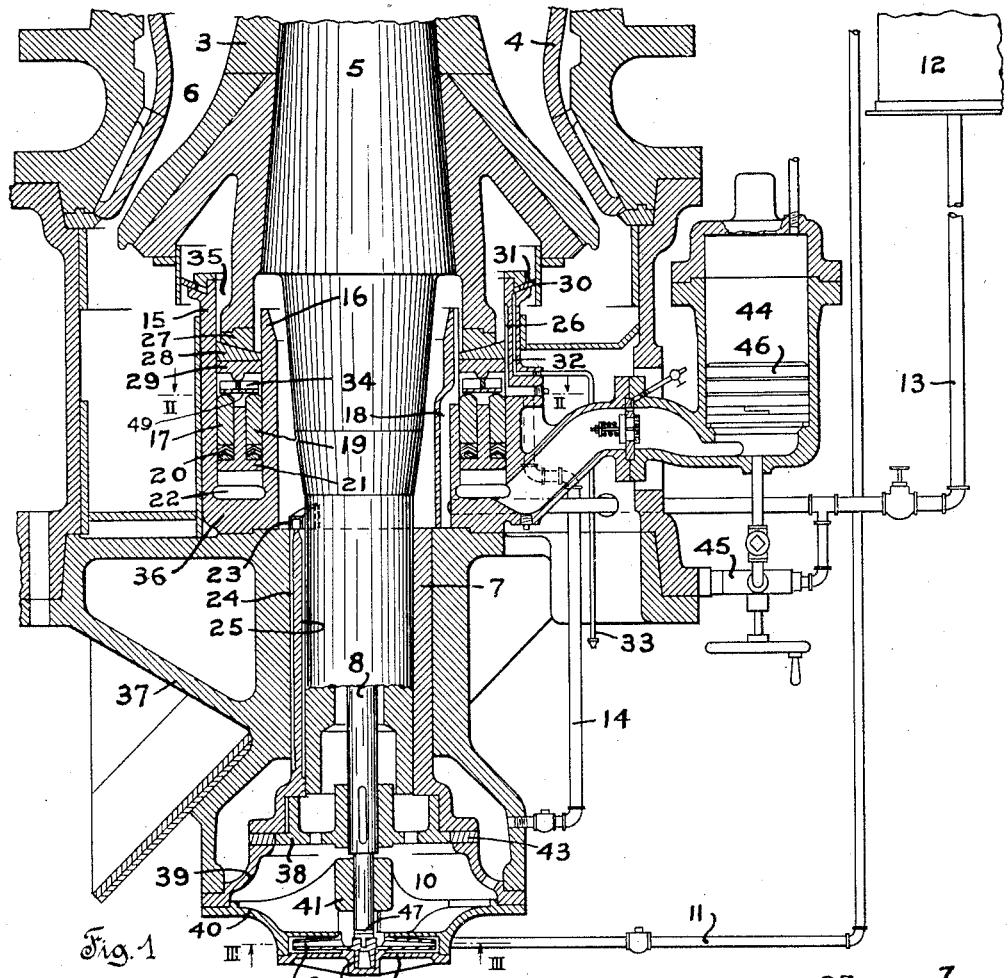
Fig. 1 is a fragmentary central vertical section through the lower portion of a gyratory crusher having the improved lubricating system applied thereto.
Figure 2:
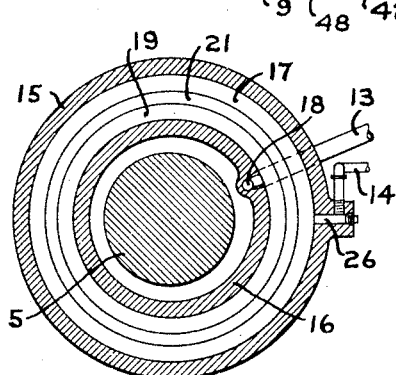
Fig. 2 is a transverse horizontal section through the central portion of the crusher, the section being taken along the line II—II of Fig. 1 looking in the direction of the arrows.
Figure 3:
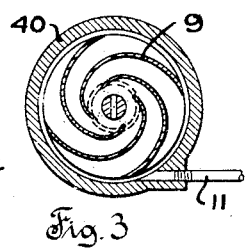
Fig. 3 is a transverse horizontal section through the extreme lower portion of the crusher structure illustrated in Fig. 1, the section being taken along the line III—III looking in the direction of the arrow.

The gyratory crusher specifically illustrated in the drawing comprises in general, a fixed outer member or concave 4; a gyratory inner member or head 3 cooperating with the concave 4 to form an annular crushing chamber 6; a hollow main shaft 5 for imparting gyratory movement to the head 3 relative to the concave 4 to crush material; a rotary eccentric 7 having a bore coacting with the lower extremity of the shaft 5 and having an outer surface coacting with a bore of the lower frame 37 to gyrate the shaft 5; and a rotary drive shaft 8 passing downwardly through the hollow center of the main shaft 5 and drivingly connected to the lower portion of the eccentric 7 by means of a perforated driving plate 38. This plate-driving connection is at present claimed in Newhouse application 452,864, filed May 16, 1930.

Disposed directly beneath the head 3 and resting upon the upper portion of the lower frame 37 above the eccentric 7, is a casing 36 having a pair of integral concentric inner and outer upstanding walls 16, 15 respectively, forming an annular recess 35 within which is located an annular vertically adjustable upper thrust bearing upon which the head 3 rests. The upper thrust bearing comprises a floating annular thrust element 28 having an upper spherical zone surface coacting directly with a bearing ring 27 secured to the head 3, and plunger structure coacting with the lower plane surface of the element 28 and reacting against fluid such as oil confined within a chamber 22 at the bottom of the recess 35. The thrust reaction plunger structure consists of a lower plunger ring 21 having a concentric annular upwardly directed projection, an upper plunger ring 29 having a concentric annular downwardly directed projection, an equalizer ring 34 coacting with the annular projection of the upper ring 29, a pair of inner and outer packing compression rings 19, 17 respectively disposed on opposite sides of the annular projection on the ring 21 and coacting with packings 20, and a sealing ring 49 disposed between the ring 34 and the upper extremities of the rings 17, 19. This improved plunger structure per se forms no part of the present invention, being claimed in Patent 1,901,722, granted March 14, 1933.

The chamber 22 is communicable past a check valve with the lower face of a piston 46, the upper face of which is exposed to an air chamber 44 wherein air is confined under considerable pressure. An oil pump 45 which may have its suction connected to the lubricant supply pipe 13, is adapted to admit oil to the chamber 22 to vary the position of adjustment of the thrust bearing for the head 3 disposed within the recess 35. Safety release and head adjustment per se likewise form no part of the present invention, being claimed in Newhouse-Stoll application 455,199, filed May 24, 1930 and in Newhouse application 452,864, filed May 16, 1930.

The lower portion of the head 3 is provided with an annular apron 30 the cylindrical inner surface of which snugly but slidably engages the periphery of a dust seal ring 31 which is laterally slidable within an annular recess associated with the upper extremity of the outer wall 15 of the casing 36. The recess within which the ring 31 is laterally slidable, is provided with a grease passage 32 communicating with a grease pipe 33 to permit grease lubrication of wearing surfaces of the dust seal ring 31 and to assist in sealing.

As previously stated, the eccentric 7 which coacts with the lower extremity of the main shaft 5, is rotatably supported in a bore of the lower frame 37, the eccentric 7 also being provided with a thrust ring 43 which coacts with a thrust bearing 39 detachably associated with the lower extremity of the frame 37. A lower plate 40 secured to the thrust bearing 39 has a guide bearing 41, for the lower extremity of the drive shaft 8, formed integral therewith, and the plate 40 cooperates with the thrust bearing 39 to provide an oil collecting chamber 10 beneath the eccentric 7. The plate 40 furthermore provides a housing for a centrifugal pump rotor 9 which is drivingly connected to the lower extremity of the shaft 8 by means of a universal joint 47, and which is rotatably supported in a bearing 48 formed in a detachable cap 42 secured to the bottom of the plate 40. These details, minus the pump rotor which is for lubricating purposes, and their arrangements are being claimed in the Newhouse application 452,864, filed May 16, 1930.

The discharge pipe 11 of the centrifugal oil circulating pump is directed into an elevated oil purifier 12 which also serves as a source of supply for the oil delivered by gravity to the crusher bearings. The discharge pipe 13 which communicates with the purifier 12, besides being connected to the pump 45 as previously indicated, communicates with a vertical passage or conduit 18 which extends upwardly through the inner wall 16 and is adapted to deliver oil to the upper portion of the recess 35 and to the element 28, irrespective of the position of adjustment of this element. The inner wall 16 is of less height than the outer wall 15, and the elements constituting the thrust bearing located within the recess 35 are so formed that only relatively small quantities of leakage oil can pass from the interior of the ring to the exterior thereof. The major portion of the oil delivered to the upper inner portion of the recess 35 must flow over the upper extremity of the inner wall 16 and is subsequently delivered by gravity into the space directly above the eccentric 7.

Figure 4:
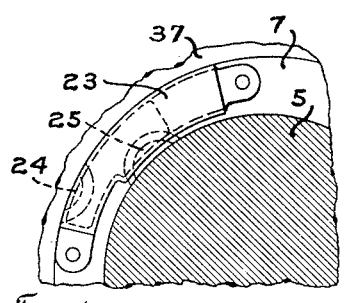
Fig. 4 is an enlarged fragmentary part sectional view of the crusher illustrated in Fig. 1, looking downwardly toward a portion of the top of the driving eccentric.

The upper portion of the eccentric 7 is provided with an oil scoop 23 which is adapted to rotate with the eccentric 7 and with its open end foremost. The interior of the scoop 23 communicates first with and forces oil into a vertical oil groove 25 formed in the inner bearing portion of the eccentric 7, and communicates subsequently with and forces oil into an oil groove 24 formed in the outer bearing portion of the eccentric, as shown in Fig. 4. The inner oil groove 25 does not cut through at the bottom, and merely forms a standpipe for maintaining a supply of oil adjacent to the inner bearing surface of the eccentric 7, but the outer oil groove 24 is cut through and is adapted to discharge oil freely through the thrust plate 39 and into the collecting chamber 10 to the pump rotor 9.

The space surrounding the bearing ring 27 within the outer wall 15 is provided with a drain passage 26 communicating with a drain pipe 14 which is adapted to deliver any leakage oil passing laterally through the thrust bearing, into the collecting chamber 10 through an opening in the thrust bearing 39.

During normal operation of the crusher, the drive shaft 8 imparts rotation to the eccentric 7 through the connecting plate 38, and the pump rotor 9 is being revolved at relatively high speed. Rotation of the eccentric 7 produces gyration of the main shaft 5 and of the head 3 relative to the concave 4, thereby crushing the material admitted to the chamber 6 and permitting the crushed material to drop by gravity from the annular crusher discharge. The rotation of the rotor 9 causes the same to withdraw oil constantly from the collecting chamber 10 and to deliver the oil through the discharge pipe 11 to the purifier 12. After being cleansed in the purifier 12, the oil is constantly delivered by gravity and in abundant quantities through the discharge pipe 13 to the conduit 18 from whence the oil is discharged over the interior of the thrust element 28 and thus insures abundant lubrication of the surfaces on the opposite sides of this element. The surplus oil rises and eventually flows over the upper extremity of the inner wall 16 and subsequently gravitates toward the eccentric 7. Due to the gyration of the shaft 5, the oil thus delivered toward the eccentric tends to pile up along the inner surface of the wall 16, but the scoop 23 picks up this oil and urges it downwardly through the oil grooves 25, 24 thereby insuring abundant lubrication of the inner and outer surfaces of the eccentric 7. The oil which succeeds in passing downwardly from the inner surface of the eccentric, serves to lubricate the surfaces of the thrust bearing 39 and thrust ring 43, and the oil which passes freely through the outer oil groove 24 is delivered through the perforated thrust bearing 39 to the collecting chamber 10 preparatory to re-circulation thereof.

Any oil which succeeds in passing laterally outwardly beyond the bearing surfaces of the annular thrust element 28, is quickly discharged through the passage 26 and drain pipe 14.

If it becomes desirable to adjust the vertical position of the thrust bearing within the recess 35, the pump 45 may be utilized to increase the quantity of oil in the chamber 22 and thereby increase the height of the thrust bearing, and a suitable drain pipe, which may advantageously be the connection in which the pump 45 and valve are shown located and communicating with the discharge or supply pipe 13, may be utilized in order to lower the thrust bearing by removing a quantity of oil from the chamber 22. It will thus be noted that the lubricating oil may be readily utilized to effect vertical adjustment of the thrust bearing.

It will moreover be apparent that the improved lubricating system insures effective lubrication of all of the bearings by supplying an abundance of oil thereto. The drain passages 26, 14 provide efficient means for preventing lubricating oil from reaching the product discharged by the crusher, and the scoop 23 insures abundant lubrication of the inner and outer surfaces of the eccentric 7. The pump rotor 9 may be conveniently removed by merely removing the cap 42, and suitable valves may be provided to prevent waste of oil from the pipe 11, when the pump rotor is thus removed.

The improved lubricating system has thoroughly demonstrated its utility by successful practical application to crushers, and there has never been any danger of overheating of the oil in the system, in spite of the enormous pressures to which the bearings of such machines are subjected.

It should be understood that it is not desired to limit the invention to the exact details of construction and operation herein shown and described, for various modifications within the scope of the claims may occur to persons skilled in the art.

It is claimed and desired to secure by Letters Patent:

1. In combination, a gyratory member, inner and outer fixed walls forming an annular recess adjoining said member, a thrust bearing for said member disposed within said recess, means for supplying oil to said recess, and a dust seal between said outer wall and said member.

2. In combination, a movable member, inner and outer fixed walls forming an annular recess adjoining said member, an annular thrust bearing for said member disposed within said recess, means for supplying oil to said recess at a point within said bearing, means for conducting oil from said recess at the exterior of said bearing, and a dust seal between said outer wall and said member and disposed above said conducting means.

3. In combination, a movable member, inner and outer fixed walls forming an annular recess beneath said member, a plunger vertically adjustable within said recess, means for admitting oil to said recess above said plunger irrespective of the position of vertical adjustment of said plunger, a dust seal formed to permit vertical adjustment of said movable member, said dust seal being located between said movable member and the outer wall of said recess and in open communication with said recess, and means for preventing oil from within said recess from reaching said seal.

4. In combination, a movable member, means forming an annular recess beneath said member, an annular thrust bearing within said recess, means for draining leakage oil from said recess externally of said bearing, and means for supplying oil to said recess within said bearing and for conducting said oil away from said recess within said bearing.

5. In combination, a movable member, stationary walls forming an annular recess beneath said member, a thrust bearing within said recess, a dust seal above said thrust bearing and coacting with said member laterally beyond the periphery of said recess, and an oil drain between said bearing and outer wall and disposed beneath said seal.

6. In combination, a movable member, means forming an annular recess beneath said member, a plunger within said recess, means for admitting oil to said recess above said plunger, an eccentric for moving said member, and means for subsequently delivering oil from said recess to said eccentric.

7. In combination, a shaft, an eccentric for gyrating said shaft, and a scoop rotatable with said eccentric and registering with grooves therein for forcing oil along both the inner and outer surfaces thereof.

8. In combination, a shaft, an eccentric for gyrating said shaft, and a scoop rotatable with said eccentric and registering with grooves therein for forcing oil along the inner and outer surfaces thereof, said scoop and grooves being arranged to cause oil to be forced along the inner surface of said eccentric in advance of the outer surface thereof, as referred to the direction of rotation of said eccentric.

9. In combination, a movable member, a thrust bearing for said member, an eccentric for moving said member located beneath said bearing, a shaft within said eccentric for rotating said eccentric, and a pump bodily detachably associated with an end of said shaft, said pump being adapted to remove oil discharged by gravity from said eccentric.

10. In combination, a movable member, an eccentric for moving said member, means forming a chamber for collecting oil discharged by gravity from said eccentric, a pump for removing oil from said chamber and for delivering said oil to said eccentric, and a universal joint between said pump and said eccentric whereby said pump is bodily detachable when said chamber is opened.

11. In combination, a gyratory member, an eccentric for gyrating said member, a drive shaft within said eccentric for rotating said eccentric, a perforated plate drivingly connecting said shaft with the lower end of said eccentric, a guide bearing for said shaft beneath said plate, a pump rotor drivingly connected with said shaft beyond said bearing, and means forming an oil collecting chamber between said plate and said rotor.

12. In combination, inner and outer crushing members, a pair of concentric walls forming an annular recess beneath said inner member, the outer of said walls being higher than the inner wall, and a thrust bearing for said inner member movably disposed between said walls.

13. In combination, inner and outer crushing members, a pair of concentric walls forming an annular recess beneath said inner member, a thrust bearing for said inner member movably disposed within said recess, and an eccentric for gyrating said inner member disposed beneath said thrust bearing and communicating with said recess over said inner wall.

14. In combination, inner and outer crushing members, a pair of concentric walls forming an annular recess beneath said inner member, the outer of said walls being higher than the inner wall, a dust seal between said outer wall and said inner member, a thrust bearing for said inner member disposed within said recess, and an eccentric for gyrating said inner member, said eccentric being in open communication with said recess over said inner wall.

15. In combination, a bearing, a source of oil supply and associated connections providing a lubricating system for said bearing, a movable member, a vertically adjustable thrust bearing for said member, a fluid support for said thrust bearing, a separate connection between said source of oil supply and said fluid support, and means in said separate connection for varying the quantity of the oil providing the fluid support, to effect vertical adjustment of said movable member.

16. In combination, a bearing, a source of oil supply and associated connections providing a lubricating system for said bearing, a movable member, a vertically adjustable thrust bearing for said member, a fluid support for said thrust bearing, a separate connection between said source of oil supply and said fluid support, means in said separate connection for varying the quantity of the oil providing the fluid support, to effect vertical adjustment of said movable member, and means for draining to the lubricating system any leakage of oil from said fluid support.

RAY C. NEWHOUSE.
GEO. D. BECKER.